United States Patent [19]
Kobayashi et al.

[11] Patent Number: 5,703,868
[45] Date of Patent: Dec. 30, 1997

[54] OPTICAL INFORMATION RECORDING MEDIUM HAVING DISCERNIBLE OBVERSE AND REVERSE SIDES

[75] Inventors: Masakazu Kobayashi, Yokohama; Yoshikazu Kato, Kawasaki, both of Japan

[73] Assignee: Nippon Columbia Co., Ltd., Tokyo, Japan

[21] Appl. No.: 728,493

[22] Filed: Oct. 9, 1996

[30] Foreign Application Priority Data

Dec. 8, 1995 [JP] Japan ................... 7-345573

[51] Int. Cl.$^6$ ................................. G11B 7/24
[52] U.S. Cl. ................................. 369/286
[58] Field of Search .................. 369/286, 283, 369/284; 360/133, 135

[56] References Cited

FOREIGN PATENT DOCUMENTS

| | | |
|---|---|---|
| 56-19532(A) | 2/1981 | Japan . |
| 56-22229(A) | 3/1981 | Japan . |
| 4-90146(A) | 3/1992 | Japan . |
| 5-290409(A) | 11/1993 | Japan . |

*Primary Examiner*—Jefferson Evans
*Attorney, Agent, or Firm*—Dickstein, Shapiro, Morin & Oshinsky LLP

[57] ABSTRACT

A laminate type optical information recording medium which is identifiable on the basis of its color, is formed without change to conventional manufacturing steps by laminating two optical information recording media, each of which includes at least a substrate on which information is recorded, a semi-transparent layer for reflecting a reproduction laser beam, a transparent resin layer formed to cover the semi-transparent layer, a reflection layer for reflecting the reproduction laser beam and an adhesive layer formed to cover the reflection layer. The two substrates of the laminate type optical information recording medium have different transmission spectra in a visible region.

24 Claims, 6 Drawing Sheets

OPTICAL INFORMATION RECORDING MEDIUM HAVING DISCERNIBLE OBVERSE AND REVERSE SIDES

BACKGROUND OF THE INVENTION

1. Field of the Invention

The present invention relates to an optical information recording medium on which information is recorded so as to be optically reproducible by being irradiated with a laser beam and detecting a reflected laser beam, and more particularly to an optical information recording medium whose obverse and reverse sides are discernible from each other.

2. Description of Related Art

A laser disc (hereinafter referred to as "LD") has been well known and is in wide use as a laminate type optical disc which is formed by laminating two optical discs. In the case of LDs, the content of information recorded on each LD (for example, the title of the disc, titles of pieces of music or pictures recorded on the disc, the name of the maker, etc.) is indicated by attaching a label sheet of 85 mm in outer diameter and 36 mm in inner diameter to the center portion of the disc.

With respect to the LDs, the label sheet has a large area, and thus sufficient visibility can be obtained for the indication of the content with the label sheet as described above.

Further, as another laminate type optical disc there has been known a digital versatile disc (hereinafter referred to as "DVD") whose information recording density is increased to about six to eight times of that of a compact disc (hereinafter referred to as "CD").

Figure 6:
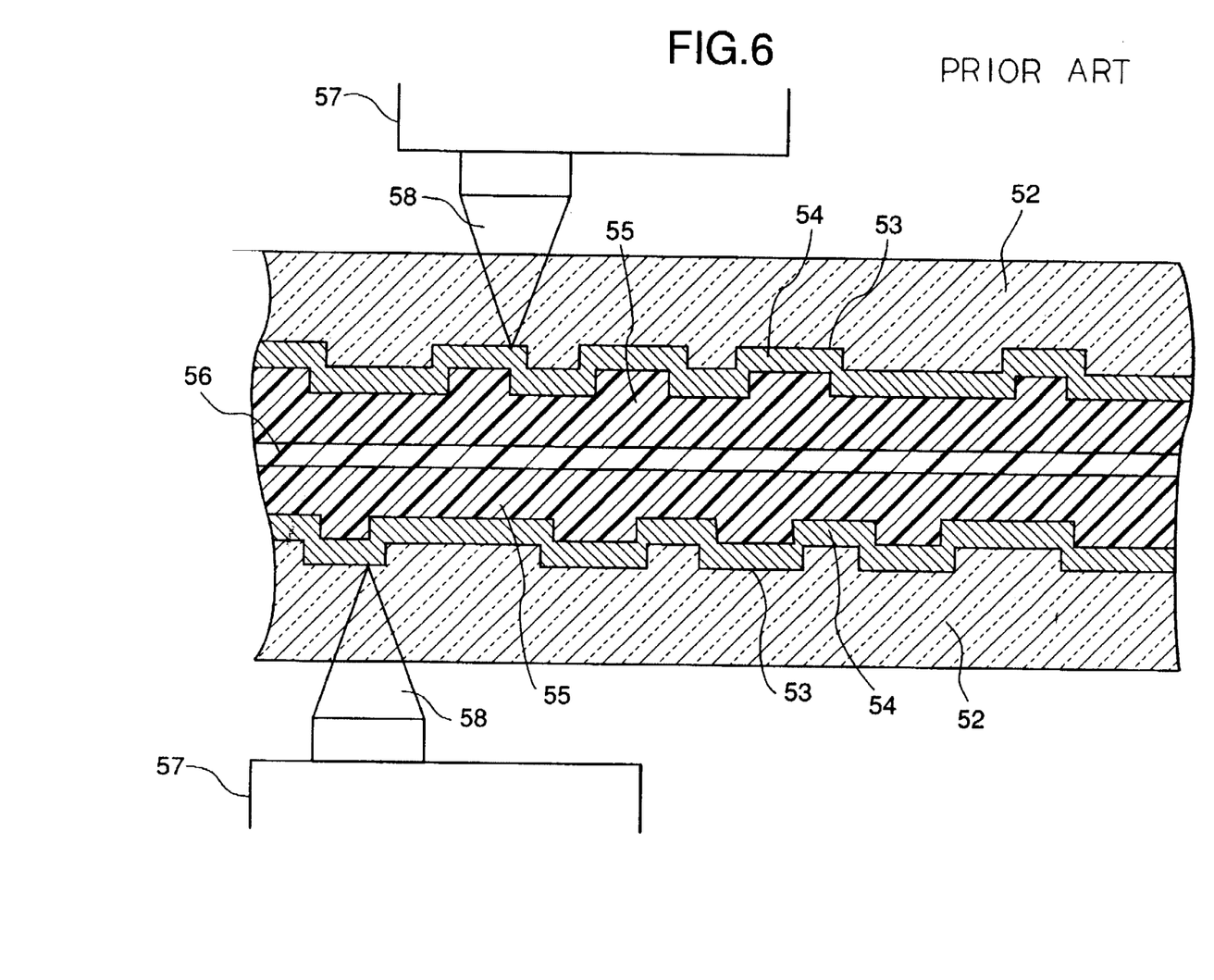
FIG. 6 shows the sectional structure of a DVD based on a conventional technique.

FIG. 6 is a cross-sectional view showing a DVD.

As shown in FIG. 6, an information recording face 53 on which information is recorded is formed on a transparent substrate 52 of 120 mm in diameter and 0.6 mm in thickness. The surface of the information recording face 53 is coated with a reflection layer 54 formed of metal such as aluminum or the like from which the laser beam is reflected. The reflection layer 54 is further coated with a protection layer 55, and the protection layer 55 serves to protect the information recording face 53. Two optical information recording media are formed in the manner as described above. Thereafter, the protection layer 55 of one of the optical information recording media is provided with an adhesive layer 56 formed of ultraviolet-ray curing resin or the like, and adhesively attached to the protection layer 55 of the other optical information recording medium to form a laminate type optical information recording medium.

A reproduction laser beam 58 is irradiated from an optical pick-up 57 onto the DVD which is the laminate type optical information recording medium thus formed, thereby reading out recording information from the recording medium. There are known other various types of DVDs, such as a multilayer type in which a substrate has two information recording faces, a high density type in which two multilayer types of optical information recording media are adhesively laminated to enhance the density of the recording medium, etc.

The DVD has a disc diameter of 120 mm, a central-hole diameter of 15 mm and a 46 mm diameter recording area starting portion, and thus it has a smaller dimension than an LD. Further, only a small area for displaying recorded information is left at the center hole portion because the hole portion is used to clamp the disc. In the case of the method of attaching a label sheet to the center hole portion, if the recorded information is displayed by attaching the label sheet like a LD, unlike the LD, a large area cannot be secured and thus visibility of the display content is lowered.

Further, as described above, the DVD is designed as a double-sided reproducible optical information recording medium to enhance the density. In the double-sided optical information recording medium, if the content display on the information recorded on the optical information recording medium is provided on the overall surface of the protection layer of the optical information recording medium in the same manner as used for a CD, it would be impossible to read out recording signals irrespective of the display manner (i.e., printing or attachment of a label sheet).

As described above, with respect to the DVD, it is difficult to display the content on the information recorded on the main body of the optical information recording medium because it is a compact-size laminate type of optical information recording medium.

As described above, it is difficult to discriminate the obverse and reverse sides of the optical information recording medium (hereinafter the obverse side (surface) is referred to as the "A side", and the reverse side (surface) is referred to as the "B side") from each other at the pre-stage of the laminate process of the optical information recording media because the content display is impossible or the visibility of the content display is low. A technique for solving this problem is disclosed in Japanese Laid-open Patent Application No. Sho-56-19532.

Specifically, according to an embodiment as disclosed in Japanese Laid-open Patent Application No. Sho-56-19532, a metal thin film or a coating layer is colored with paint to cause a difference in color between the obverse and reverse sides of a non-recording area. Further, according to another embodiment as disclosed in Japanese Laid-open Patent Application No. Sho-56-19532, the obverse and reverse sides of a laminate type optical information recording medium are coated with different color materials.

SUMMARY OF THE INVENTION

In the method of coloring the metal thin film or the coating film with paint to cause difference in color between both sides of the non-recording area, a step of coloring the metal thin film or the coating film with paint is newly added to a DVD manufacturing process. In addition, a recording area may also be unintentionally colored by the paint. Further, if the paint comes into contact with the recording area, the recording area may be damaged. In addition, the non-recording area may be erroneously colored with paint whose color is different from a color with which the non-recording area should be originally colored.

Furthermore, in the method of coating both sides of the optical information recording medium with different color materials, a step of coating is added to a DVD manufacturing process. Also, the optical information recording medium may be erroneously coated with a color material different from a color material with which the optical information recording medium should be originally coated. In addition, in a spin coating process, the coating may become uneven to induce a defect, or a scattered coating material may be attached to the optical information recording medium so as to induce a defect.

The increase in the number of steps of the manufacturing process heightens the possibility of the occurrence of defects, and thus it is not preferable from the viewpoint of reduction in the rate of defects.

As described above, according to the conventional method of manufacturing an optical information recording medium in which A-side and B-side substrates are discernible from each other, the number of steps of the manufacturing process increases, resulting in an increase in the rate of defects.

Therefore, an object of the present invention is to provide an optical information recording medium in which no step is further needed for a manufacturing process and thus the rate of defects is not increased, and each of an A side and a B side is identifiable (the A and B sides are discernible from each other).

In order to attain the above object, according to a first aspect of the present invention, a plate-shaped optical information recording medium on which information is recorded and from which the information is optically reproduced by being irradiated with a reproduction laser beam and detecting the reflected reproduction laser beam, is characterized by comprising a first transmission portion through which light incident onto the obverse surface side of the optical information recording medium is transmitted, a second transmission portion through which light incident onto the reverse surface side of the optical information recording medium is transmitted, and a reflection portion which is provided between the first transmission portion and the second transmission portion and from which the light transmitted from the first transmission portion and the light transmitted from the second transmission portion are respectively reflected, the first and second transmission portions having different transmission spectra from each other in a visible region.

According to a second aspect of the present invention, a plate-shaped optical information recording medium on which information is recorded and from which the information is optically reproduced by being irradiated with a reproduction laser beam and detecting the reflected reproduction laser beam, is characterized by comprising a first transmission portion through which light incident onto the obverse surface side of the optical information recording medium is transmitted, a second transmission portion through which light incident onto the reverse surface side of the optical information recording medium is transmitted, and a reflection portion which is provided between the first transmission portion and the second transmission portion and from which the light transmitted from the first transmission portion and the light transmitted from the second transmission portion are respectively reflected, the reflection portion having different reflection spectra between the light in the visible region which is transmitted through the first transmission portion and the light in the visible region which is transmitted through the second transmission portion.

According to the first aspect of the present invention, the first transmission portion and the second transmission portion have different transmission spectra in the visible region, so that the obverse and reverse sides of the optical information recording medium can be discriminated from each other on the basis of a color difference. Further, by changing materials used for the first and second transmission portions, the first transmission portion and the second transmission portion can be provided with different transmission spectra from each other in the visible region. Therefore, no new step is needed in the manufacturing process to discriminate the obverse and reverse sides from each other on the basis of the color difference.

Further, according to the second aspect of the present invention, the reflection spectra of the light in the visible region which is transmitted from the first transmission portion and then reflected from the reflection portion is different from the reflection spectra of the light in the visible region which is transmitted from the second transmission portion and then reflected from the reflection portion. Therefore, the obverse and reverse sides (surfaces) of the optical information recording medium can be discriminated from each other by the color difference. Further, by changing the material used for the reflection portion, the first transmission portion side and the second transmission portion side of the reflection portion can be provided with different reflection spectra from each other in the visible region. Therefore, no new step is needed in the manufacturing process to discriminate the obverse and reverse sides from each other on the basis of the color difference.

DETAILED DESCRIPTION OF THE PREFERRED EMBODIMENTS

Preferred embodiments according to the present invention will be described hereunder with reference to the accompanying drawings.

First, a first embodiment according to the present invention will be described.

Figure 1:
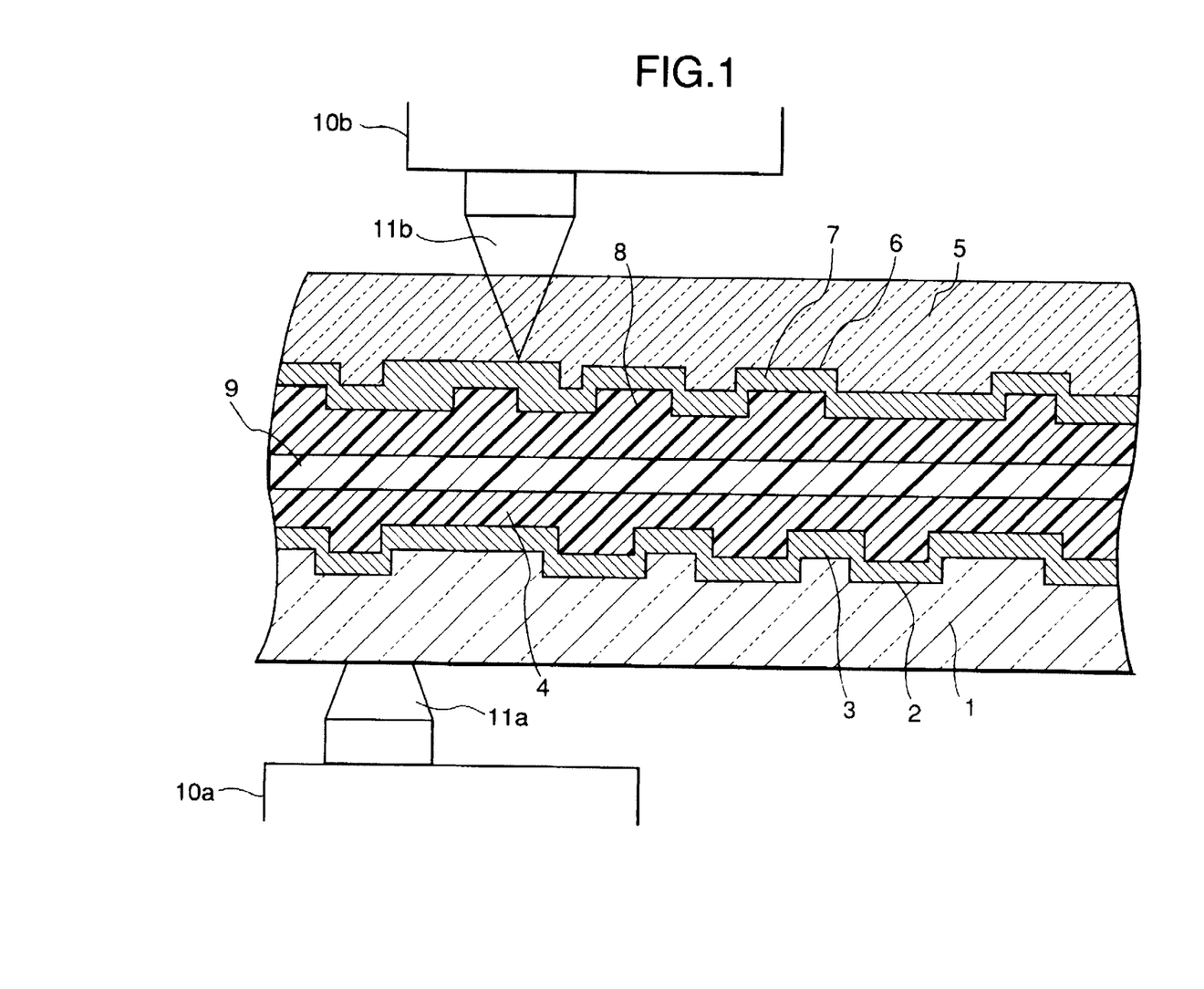
FIG. 1 is a cross-sectional view showing a laminate type optical information recording medium which is manufactured by laminating two optical information recording media according to a first embodiment of the present invention.

FIG. 1 is a cross-sectional view showing a laminate type optical information recording medium of the first embodiment, which is formed by laminating two optical information recording medium.

In FIG. 1, a first substrate 1 has a first information recording face 2 on which information is recorded in such a manner as to be optically reproducible. The first information recording face 2 is formed with depressions which are called pits, and recorded from the center of the disc in a spiral form or a concentric circle form. The first information recording face 2 is covered by a first reflection layer 3 for reflecting a reproduction laser beam, and the first reflection layer 3 is covered by a first protection layer 4 to protect the pits, etc. from dust, external impact, etc. With this process, an optical information recording medium is constructed.

A second substrate 5 has a second information recording face 6 on which information different from that recorded on the first information recording face 2 is recorded. The second information recording face 6 is also covered by a second reflection layer 7 for reflecting a reproduction laser beam, and the second reflection layer 7 is also covered by a second protection layer 8 to protect the pits, etc. from dust, external impact, etc. With this process, another optical information recording medium is constructed.

Here, the first substrate 1 and the second substrate 5 have different transmission spectra in the visible region. The first and second substrates 1 and 5 are formed of polycarbonate or the like which is dyed (colored) in advance. The dyed polycarbonate as described above can be obtained by mixing well-known dye into polycarbonate or the like which has been conventionally used for a substrate. As the well-known dye there may be used cyanine dye for blue and azo dye for red, for example.

The first protection layer 4 of one of the two optical information recording media thus formed is coated with an adhesive layer 9 which is formed of ultraviolet-ray curing resin or the like, and then overlaid on and adhesively attached to the second protection layer 8 of the other optical information recording medium. The laminate type optical information recording medium according to the embodiment is formed as described above. In place of the ultraviolet-ray curing resin, the adhesive layer 9 may be formed of hot-melt adhesive or other adhesive such as acrylic resin, urethane resin or the like.

A reproduction laser beam 11a irradiated from an optical pickup 10a is transmitted through the first substrate 1, and irradiated onto the first information recording face 2. Further, a reproduction laser beam 11b irradiated from an optical pickup 10b is transmitted through the second substrate 5 and irradiated onto the second information recording face 6. When both the sides of the laminate type optical information recording medium are reproduced, the optical information recording medium is reversed to change the reproduction surface, or the optical pickup may be designed so that the laser beams are irradiated from the upper and lower sides.

In this embodiment, the first substrate 1 and the second substrate 5 have different transmission spectra in the visible region, so that the surface at the first substrate side and the surface at the second substrate side can be discriminated from each other.

In the following description, the surface at the first substrate 1 side is referred to as an "A-side", and the surface at the second substrate 5 side is referred to as a "B-side", and it is assumed that the first substrate 1 is formed of polycarbonate mixed with azo dye, and the second substrate 5 is formed of polycarbonate mixed with cyanine dye. When a person sees the laminate type optical information recording medium, he or she recognizes the A-side as red and the B-side as blue (i.e., the A-side looks red and the B-side looks blue). As described above, the two optical information recording media with the first and second substrates 1 and 5 having different transmission spectra are laminated to each other to form the laminate type optical information recording medium, thereby enabling the discrimination (identification) of the A-side and the B-side.

In place of the above-described manner of designing the first and second substrates 1 and 5 to have different transmission spectra in the visible region, the first and second reflection layers 3 and 7 may be designed to have different reflection spectra in the visible region. Aluminum (Al) which is used for conventional CDs may be used as a material of the reflection layer. The reflectance of aluminum with respect to the laser beam is equal to about 90% for the reproduction laser beam of 650 nm wavelength which is used for DVDs. Therefore, aluminum is used as the material of the first reflection layer 3.

Gold (Au) is known as an example of metal having different spectra from that of aluminum in the visible region. The reflectance of gold is equal to about 95% for the reproduction laser beam of 650 nm wavelength which is used for the DVDs. Therefore, gold is used as .the material of the second reflection layer 7.

With the selection of the materials as described above, when a person sees the laminate type optical information recording medium, he or she recognizes the A-side at the first reflection layer 3 side as having a silver color and the B-side of the second reflection layer 7 side as having a gold color (i.e., the A-side looks silver and the B-side looks gold) if the first and second substrates 1 and 5 are transparent. As described above, the two optical information recording media with the first and second reflection layers 3 and 7 having different reflection spectra are laminated to each other to form the laminate type optical information recording medium, thereby enabling the discrimination (identification) of the A-side and the B-side.

Further, there may be formed two optical information recording media for lamination, one of which has a first substrate 1 and a first reflection layer 3 which look red and silver respectively before a lamination process of these two optical information recording media, and the other of which has a second substrate 5 and a second reflection layer 7 which look blue and gold respectively before the lamination process. In this case, each of the optical information recording media can be discriminated (identified) by viewing it from any one of the obverse and reverse sides thereof.

With the laminate type optical information recording medium according to this embodiment, the protection layer of one of the two optical information recording media is coated with an adhesive layer, and then overlaid on and adhesively attached to the protection layer of the other optical information recording medium. However, the adhesion of the two optical information recording media may be also performed in the following manner. That is, no protection layer is provided to both the optical information recording media, and one reflection layer is directly coated with an adhesive layer and then adhesively attached to the other reflection layer while overlaid on the other reflection layer. This embodiment is applicable to such a case.

Next, a second embodiment will be described.

Figure 2:
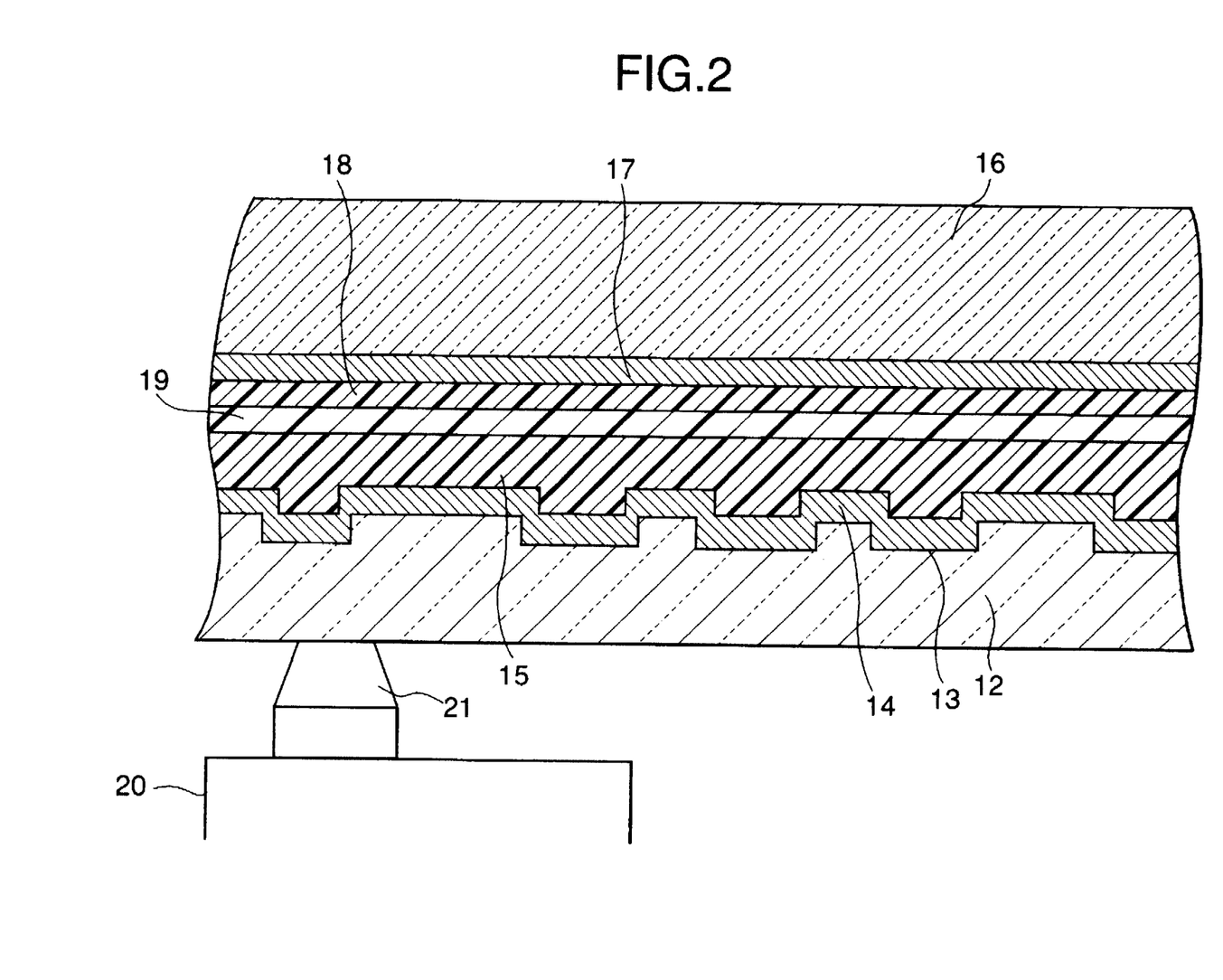
FIG. 2 is a cross-sectional view showing a laminate type optical information recording medium which is manufactured by laminating an optical information recording medium and a dummy disc in a second embodiment of the present invention.

FIG. 2 shows a second embodiment according to the present invention, and is a cross-sectional view showing a laminate type optical information recording medium which is manufactured by laminating an optical information recording medium and a dummy disc.

In FIG. 2, a first substrate 12 has a first information recording face 13 on which information is recorded so as to be optically reproducible. The first information recording face 13 is formed with recesses which are called pits, and recorded from the center of the disc in a spiral form or a concentric circle form. The first information recording face 13 is covered by a first reflection layer 14 for reflecting a reproduction laser beam, and the first reflection layer 14 is covered by a first protection layer 15 to protect the pits, etc. from dust, external impact, etc. With this process, an optical information recording medium is constructed.

A second substrate 16 is not provided with an information recording face like the first information recording face 13. It has a face having a perfect flat face or a printed face. This face is covered by a second reflection layer 17. Further, the second reflection layer 17 is covered by a second protection layer 18 to protect the face from dust, external impact, etc. With this process, a dummy disc is formed.

Here, the first substrate 12 and the second substrate 16 have different transmission spectra in the visible region. The first and second substrates 12 and 16 are formed of polycarbonate or the like which is dyed (colored) in advance. The dyed polycarbonate as described above can be obtained by mixing well-known dye into polycarbonate or the like which has been conventionally used for a substrate. As the well-known dye there may be used cyanine dye for blue and azo dye for red, for example.

The first protection layer 15 of the optical information recording media thus formed is coated with an adhesive layer 19 which is formed of ultraviolet-ray curing resin or the like, and then overlaid on and adhesively attached to the second protection layer 18 of the dummy disc. The laminate type optical information recording medium according to the present embodiment is formed as described above. In place of the ultraviolet-ray curing resin, the adhesive layer 19 may be formed of hot-melt adhesive or other adhesive such as acrylic resin, urethane resin or the like.

A reproduction laser beam 21 irradiated from an optical pickup 20 is transmitted through the first substrate 12, and irradiated onto the first information recording face 13. Here, the reason why the optical information recording face is adhesively attached to the dummy disc to form the laminate type optical information recording medium resides in that there is a case where it is sufficient to reproduce only one side because of a small amount recording information, but it is required to meet standards for the mechanical dimension of the laminate type optical information recording medium. The content of the recording information may be displayed by printing the content on any one surface of the second substrate of the dummy disc.

In this embodiment, the first substrate 12 and the second substrate 16 have different transmission spectra in the visible region, so that the surface at the first substrate side and the surface at the second substrate side can be discriminated from each other.

In the following description, the surface at the first substrate 12 side is referred to as the "A-side", and the surface at the second substrate 16 side is referred to as the "B-side", and it is assumed that the first substrate 12 is formed of polycarbonate mixed with azo dye, and the second substrate 16 is formed of polycarbonate mixed with cyanine dye. When a person sees the laminate type optical information recording medium, he or she recognizes the A-side as red and the B-side as blue (i.e., the A-side looks red and the B-side looks blue). As described above, the optical information recording medium having the first substrate 12 and the dummy disc having the second substrate 16 whose color is different from that of the first substrate 12, are laminated to each other to form the laminate type optical information recording medium, thereby enabling the discrimination (identification) of the A-side and the B-side.

In place of the above-described manner of designing the first and second substrates 12 and 16 to have different transmission spectra in the visible region, the first and second reflection layers 14 and 17 may be designed to have different reflection spectra in the visible region. Aluminum (Al) which is used for conventional CDs may be used as a material of the reflection layer. The reflectance of aluminum is equal to about 90% for the reproduction laser beam of 650 nm wavelength which is used for DVDs. Therefore, aluminum is used as the material of the first reflection layer 14.

Gold (Au) is known as an example of metal having different spectra from that of aluminum in the visible region. The reflectance of gold is equal to about 95% for the reproduction laser beam of 650 nm wavelength which is used for the DVDs. Therefore, gold is used as the material of the second reflection layer 17.

With the selection of the materials as described above, when a person sees the laminate type optical information recording medium, he or she recognizes the A-side at the first reflection layer side as having a silver color and the B-side of the second reflection layer side as having a gold color (i.e., the A-side looks silver and the B-side looks gold) if the first and second substrates 12 and 16 are transparent. As described above, the optical information recording medium having the first reflection layer 14 and the dummy disc having the second reflection layers 17 whose color is different from that of the first reflection layer 14, are laminated to each other to form the laminate type optical information recording medium, thereby enabling the discrimination (identification) of the A-side and the B-side.

Further, there may be formed an optical information recording media having a first substrate 12 and a first reflection layer 14 which look red and silver respectively before the lamination process, and a dummy disc having a second substrate 16 and a second reflection layer 17 which look blue and gold respectively before the lamination process. In this case, each of the optical information recording medium and the dummy disc can be discriminated (identified) by viewing it from any one of the obverse or reverse sides thereof.

With the laminate type optical information recording medium according to this embodiment, the protection layer of the optical information recording medium is coated with an adhesive layer, and then overlaid on and adhesively attached to the protection layer of the dummy disc. However, the adhesion of the optical information recording medium and the dummy disc may also be performed in the following manner. That is, no protection is provided to either the optical information recording medium or the dummy disc, and one reflection layer is directly coated with an adhesive layer and then adhesively attached to the other reflection layer while overlaid on the other reflection layer. This embodiment is applicable to such a case.

Furthermore, with the laminate type optical information recording medium according to this embodiment, the dummy disc may be designed to have the second substrate with no second reflection layer. In this case, the laminate type optical information recording medium is formed by laminating the optical information recording medium having the first substrate 12 and the dummy disc having only the second substrate 16 whose color is different from that of the first substrate 12, thereby enabling the discrimination between the A-side and the B-side.

Next, a third embodiment according to the present invention will be described.

Figure 3:
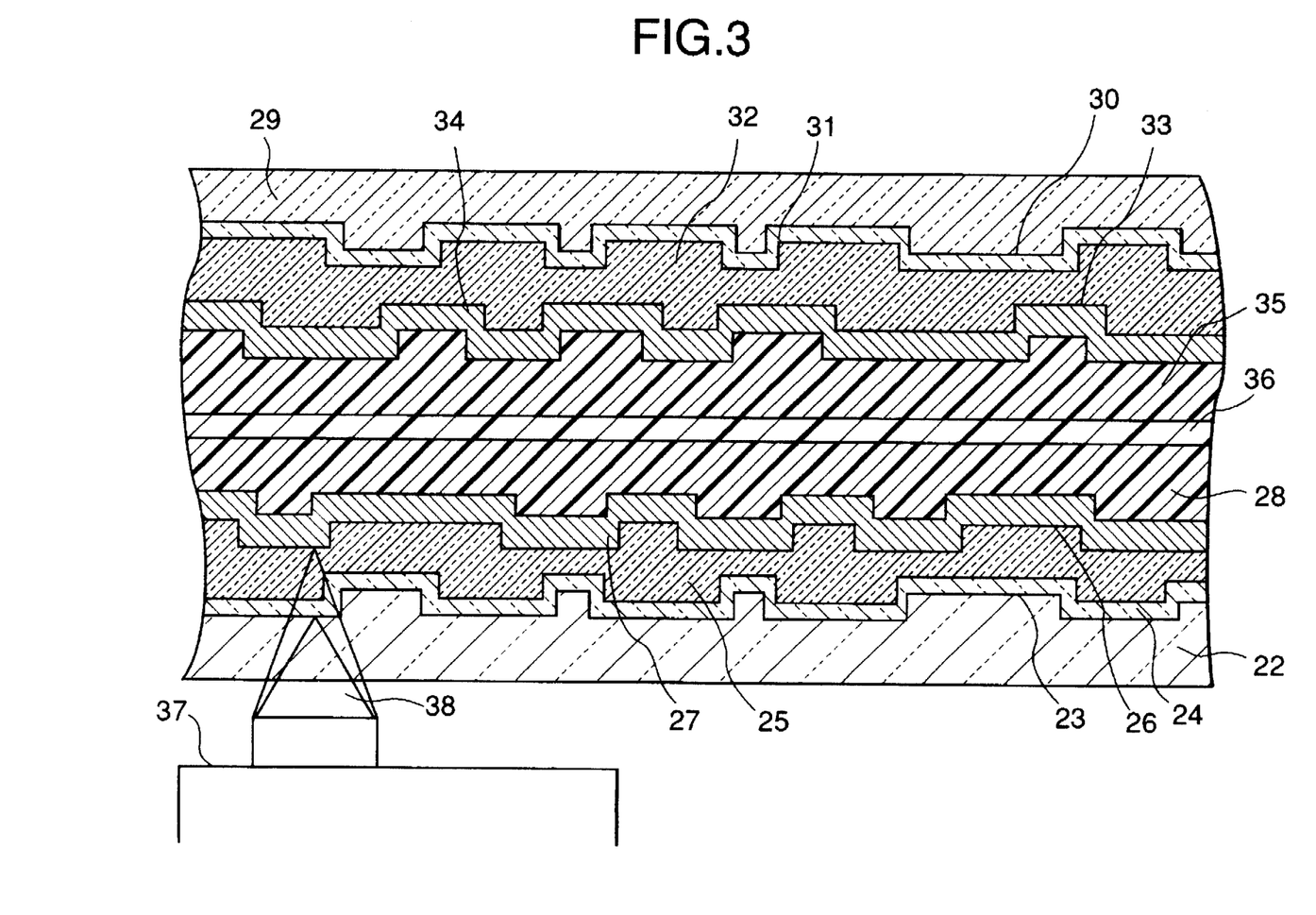
FIG. 3 is a cross-sectional view showing a laminate type optical information recording medium which is manufactured by laminating two two-layer types of optical information recording media in a third embodiment of the present invention.

FIG. 3 show a third embodiment according to the present invention, and is a cross-sectional view showing a laminate type optical information recording medium which is manufactured by laminating two two-layer type optical information recording medium.

In FIG. 3, a first substrate 22 has a first information recording face 23 on which information is recorded so as to be optically reproducible. The first information recording face 23 is covered by a first semi-transparent layer 24. The first semi-transparent layer 24 has a reflectance of about 30% for the reproduction laser beam of 650 nm wavelength which is used for DVDs for example, and it is formed of inorganic dielectric material such as silicon nitride compound, aluminum nitride compound or the like, or metal.

The first semi-transparent layer 24 is covered by a first transparent resin layer 25. The first transparent resin layer 25 is transparent to the reproduction laser beam, and it has a second information recording face 26 having information which is different from that recorded on the first information recording face 23. The second information recording face 26 is entirely covered by the first reflection layer 27 which reflects the reproduction laser beam. Further, the first reflection layer 27 is entirely covered by a first protection layer 28. With this process, an optical information recording medium is formed.

Likewise, a second substrate 29 has a third information recording face 30, and the third information recording face 30 is covered by a second semi-transparent layer 31 like the first semi-transparent layer 24. The second semi-transparent layer 31 is covered by a second transparent resin layer 32 which is transparent to the reproduction laser beam, and the second transparent resin layer 32 has a fourth information recording face 33 on which other information is recorded. The fourth information recording face 33 is entirely covered by a second reflection layer 34 for reflecting the reproduction laser beam substantially perfectly. The second reflection layer 34 is entirely covered by a second protection layer 35. With this process, the other optical information recording medium is formed. In the optical information recording media thus formed, the first substrate 22 and the second substrate 29 have different transmission spectra in the visible region.

In order to laminate the two optical information recording media thus formed, the first protection layer 28 of one optical information recording medium is coated with an adhesive layer 36 which is formed of ultraviolet-ray curing resin, hot-melt adhesive or other adhesive, and adhesively attached to the second protection layer 35 of the other optical information recording medium through the adhesive layer 36, thereby forming a laminate type optical information recording medium.

In the case where both sides of the laminate type optical information recording medium are reproduced, the optical information recording medium may be reversed to change the reproduction face, or the optical pickup 37 may be designed so that it can irradiate with the laser beam from upper and lower sides. When the reproduction face is switched from the first information recording face 23 to the second information recording face 26 or when the reproduction face is switched from the third information recording face 30 to the fourth information recording face 33, the reproduction can be performed by changing the focus point of the reproduction laser beam 38.

According to this embodiment, the first substrate 22 and the second substrate 29 have different transmission spectra in the visible region. Therefore, each substrate allows the reproduction laser beam to transmit therethrough, however, if a person sees the optical information recording medium, he recognizes the A-side and the B-side of the medium as having different colors, for example, red and blue. The optical information recording media having the first substrate 22 and the second substrate 29 which have the different transmission spectra respectively are laminated to form a laminate type optical information recording medium, whereby the discrimination (identification) of the A-side and the B-side is enabled.

In place of the above-described manner of designing the first and second substrates 22 and 29 to have different transmission spectra in the visible region, the first and second transparent resin layers 25 and 32 may be designed to have different transmission spectra in the visible region. Accordingly, if colorless substrates and semi-transparent layers through which the reproduction laser beam is transmitted are used, a person recognizes the A-side and the B-side as having different colors, for example, red and blue respectively, when he or she sees the optical information recording medium. The optical information recording media having the first transparent resin layer 25 and the second transparent resin layer 32 which have the different transmission spectra are laminated to form a laminate type optical information recording medium, whereby the discrimination (identification) of the A-side and the B-side can be performed on the basis of identification of the color.

In place of the above-described manner of designing the first and second substrates 22 and 29 to have different transmission spectra in the visible region, the first transparent resin layer 25 and the second substrate 29 may be designed to have different transmission spectra in the visible region. Accordingly, if a colorless first substrate and first semi-transparent layer through which the reproduction laser beam is transmitted are used, a person recognizes the A-side and the B-side as having different colors, for example, red and blue respectively when he or she sees the optical information recording medium. The optical information recording media having the first transparent resin layer 25 and the second substrate 29 which have the different transmission spectra are laminated to form a laminate type optical information recording medium, whereby the discrimination (identification) of the A-side and the B-side can be performed on the basis of identification of the color.

In place of the above-described manner of designing the first and second substrates 22 and 29 to have different transmission spectra in the visible region, the first and second reflection layers 27 and 34 may be designed to have different reflection spectra in the visible region. As described above, aluminum (Al) and gold (Au) are usable as the material of the reflection layers as described above. In this case, aluminum (Al) is used for the first reflection layer 27, and gold (Au) is used for the second reflection layer 34.

When a person sees the optical information recording medium, he or she recognizes the A-side and the B-side as having gold and silver respectively if the first substrate, the second substrate, the first semi-transparent layer, the second semi-transparent layer, the first transparent resin layer and the second transparent resin layer are colorless. Two optical information recording media having the first reflection layer 27 and the second reflection layer 34 which have different colors are laminated to form a laminate type optical information recording medium; thereby enabling the discrimination (identification) of the A-side and the B-side.

Further, there may be formed an optical information recording medium in which the first substrate 22 or the first transparent resin layer 25 look red and the first reflection layer 27 looks silver before the laminate process and an optical information recording medium in which the second substrate 29 or the second transparent resin layer 32 look blue and the second reflection layer 34 looks gold. In this case, even if each of the optical information recording medium is viewed from any side (the A-side (obverse surface side) or the B-side (reverse surface side)), these optical information recording media can be discriminated from each other.

With respect to the laminate type optical information recording medium as described above, the first protection layer 28 of one of the two optical information recording media is coated with the adhesive layer 36, and then the second protection layer 35 of the other optical information recording medium is overlaid on and adhesively attached to the first protection layer 28 through the adhesive layer 36. However, it may be adopted that neither of the optical information recording media are provided with a protection layer 36, and one first reflection layer 27 is directly coated with an adhesive layer 36 and then adhesively attached to the other second reflection layer 34 while overlaid on the other reflection layer. This embodiment is applicable to such a case.

Figure 4:
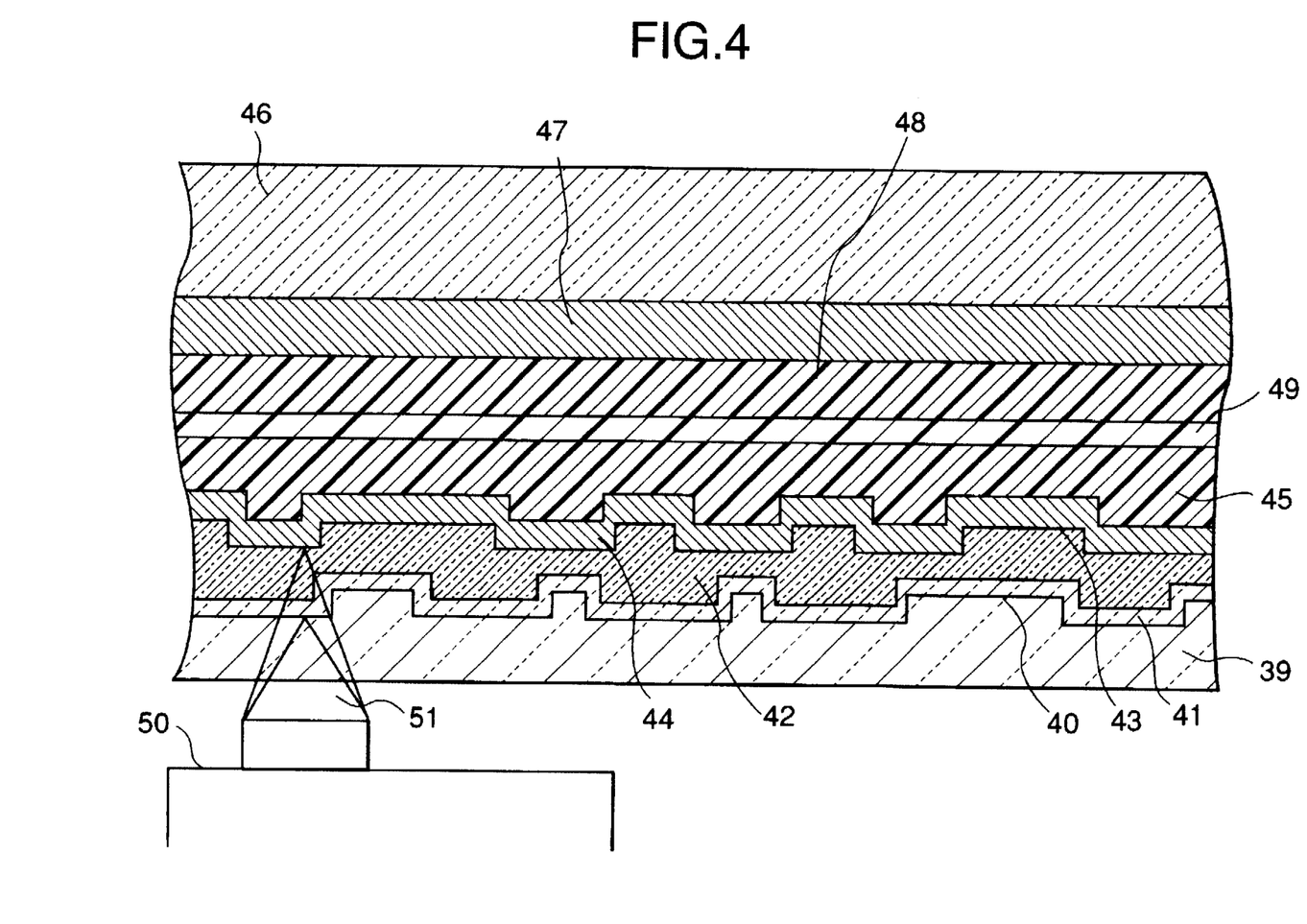
FIG. 4 is a cross-sectional view showing a laminate type optical information recording medium which is manufactured by laminating a two-layer type optical information recording medium and a dummy disc in a fourth embodiment of the present invention.

Next, a fourth embodiment according to the present invention will be described. FIG. 4 shows the fourth embodiment according to the present invention, and is a cross-sectional view showing a laminate type optical information recording medium which is manufactured by laminating a two-layer type optical information recording medium and a dummy disc.

In FIG. 4, a first substrate 39 has a first information recording face 40 on which information is recorded so as to be optically reproducible. The first information recording face 40 is covered by a first semi-transparent layer 41. The first semi-transparent layer 41 has a reflectance of about 30% for the reproduction laser beam of 650 nm wavelength which is used for DVDs, for example, formed of inorganic dielectric material such as a silicon nitride compound, aluminum nitride compound or metal.

The first semi-transparent layer 41 is covered by a first transparent resin layer 42. The first transparent resin layer 42 is transparent to the reproduction laser beam, and has a second information recording face 43 on which information different from that recorded on the first information recording face 40 is recorded. The second information recording face 43 is entirely covered by a first reflection layer 44 for reflecting the reproduction laser beam. The first reflection layer 44 is further entirely covered by a first protection layer 45. With this process, an optical information recording medium is formed.

A second substrate 46 is not provided with an information recording face like the first information recording face 40. It has a face having a perfect flat face or a printed face. This face is covered by a second reflection layer 47. Further, the second reflection layer 47 is covered by a second protection layer 48 to protect from dust, external impact, etc. With this process, a dummy disc is formed.

Here, the first substrate 39 and the second substrate 46 have different transmission spectra in the visible region.

The first protection layer 45 of the optical information recording medium thus formed is coated with an adhesive layer 49 which is formed of ultraviolet-ray curing resin or the like, and overlaid on and adhesively attached to the second protection layer 48 of the dummy disc, thereby forming a laminate type optical information recording medium. Here, in place of the ultraviolet-ray curing resin, hot-melt adhesive, or other adhesive such as acrylic resin, urethane resin or the like may be used for the adhesive layer 49.

A reproduction laser beam 51 is emitted from an optical pickup 50, transmitted through the first substrate 39, and is then irradiated onto the first information recording face 40. Here, the reason why the optical information recording medium is adhesively attached to the dummy disc to form the laminate type optical information recording medium resides in that there is a case where it is sufficient to reproduce only one side because of a small amount recording information, but it is required to meet standards for the mechanical dimension of the laminate type optical information recording medium. The content of the recording information may be displayed by printing the content on any one surface of the second substrate 46 of the dummy disc.

According to the present invention, the first substrate 39 and the second substrate 46 have different transmission spectra in the visible region. Therefore, each substrate allows the reproduction laser beam to transmit therethrough, but if a person sees the optical information recording medium or the dummy disc, he or she recognizes the A-side and the B-side thereof as having different colors, for example, red and blue, respectively. The optical information recording medium and the dummy disc in which the first substrate 39 and the second substrate 46 have the different transmission spectra are adhesively attached to each other to form a laminate type optical information recording medium, thereby enabling discrimination between the A-side and the B-side.

In place of the above-described manner of designing the first and second substrates 39 and 46 to have different transmission spectra in the visible region, the first transparent resin layer 42 and the second substrate 46 may be designed to have different transmission spectra in the visible region. Therefore, the reproduction laser beam is allowed to transmit therethrough, but, if a person sees the optical information recording medium or the dummy disc, he or she recognizes the A-side and the B-side as having different colors, for example, red and blue respectively, if the first substrate 39 is colorless and transparent. The optical information recording medium and the dummy disc in which the first transparent resin layer 42 and the second substrate 46 have different transmission spectra are adhesively attached to each other to form a laminate type optical information recording medium, thereby enabling discrimination between the A-side and the B-side thereof.

In place of the above-described manner of designing the first and second substrates 39 and 46 to have different transmission spectra in the visible region, the first and second reflection layers 44 and 47 may be designed to have different reflection spectra in the visible region. As described above, aluminum (Al) and gold (Au) are usable as the material of the reflection layers as described above. In this case, aluminum (Al) is used for the first reflection layer 44, and gold (Au) is used for the second reflection layer 47.

For example, there can be formed an optical information recording medium which looks gold when a person sees the optical information recording medium if the substrate, the semi-transparent layer and the transparent resin layer are transparent and colorless. Further, there may be formed a dummy disc which looks silver if the substrate is colorless and transparent when the dummy disc is viewed from the recording information read-out face side. The optical information recording medium having the first reflection layer 44 and the dummy disc having the second reflection layer 47, the first reflection layer 44 and the second reflection layer 47 having different reflection spectra, are adhesively attached to each other to form a laminate type optical information recording medium, thereby enabling discrimination (identification) of the A-side and the B-side thereof.

Further, there may be formed an optical information recording medium in which the first substrate 39 or the first transparent resin layer 42 looks red and the first reflection layer 44 looks silver before the laminate process and a dummy disc in which the second substrate 46 looks blue and the second reflection layer 47 looks silver. In this case, even if each of the optical information recording medium and the dummy disc is viewed from any side (the obverse surface side or the reverse surface side), these optical information recording media can be discriminated from each other.

With respect to the laminate type optical information recording medium according to this embodiment, the first protection layer 45 of the optical information recording medium is coated with the adhesive layer 49, and then the second protection layer 48 of the dummy disc is overlaid on and adhesively attached to the first protection layer 45 through the adhesive layer 49. However, it may be adopted that neither the optical information recording medium nor the dummy disc are provided with the protection layer, and the first reflection layer 44 is directly coated with the adhesive layer 49 and then adhesively attached to the second reflection layer 47 while overlaid on the second reflection layer 47. This embodiment is applicable to such a case.

With respect to the laminate type optical information recording medium as described above, the dummy disc is provided with no second reflection layer 47, but with only the second substrate 45. The optical information recording medium having the first substrate 39 and the dummy disc having only the second substrate 45, the first substrate 39 and the second substrate 45 having different colors, are adhesively attached to each other to form a laminate type optical information recording medium, thereby enabling the identification of the A-side and the B-side.

Figure 5A:
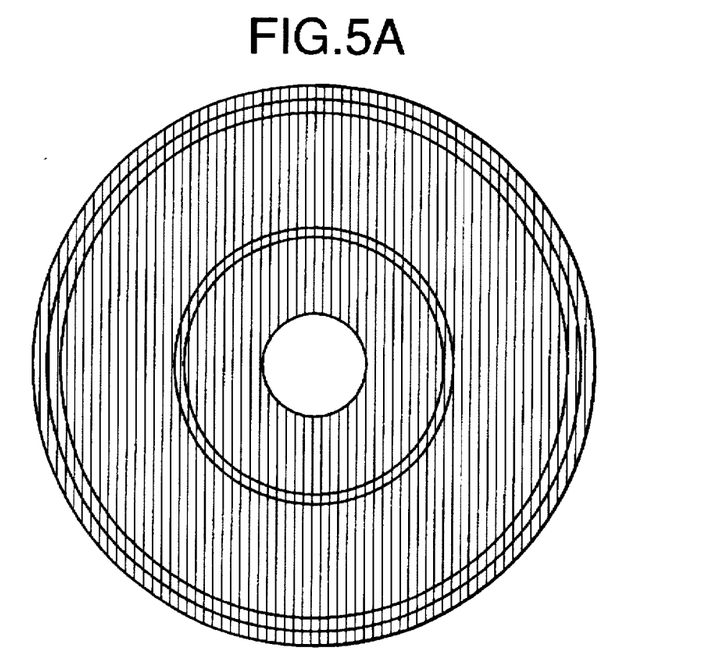
FIGS. 5A and 5B are diagrams showing the overall surface of the laminate type optical information recording medium shown in FIGS. 1 to 4, which are viewed from A side and B side respectively.
Figure 5B:
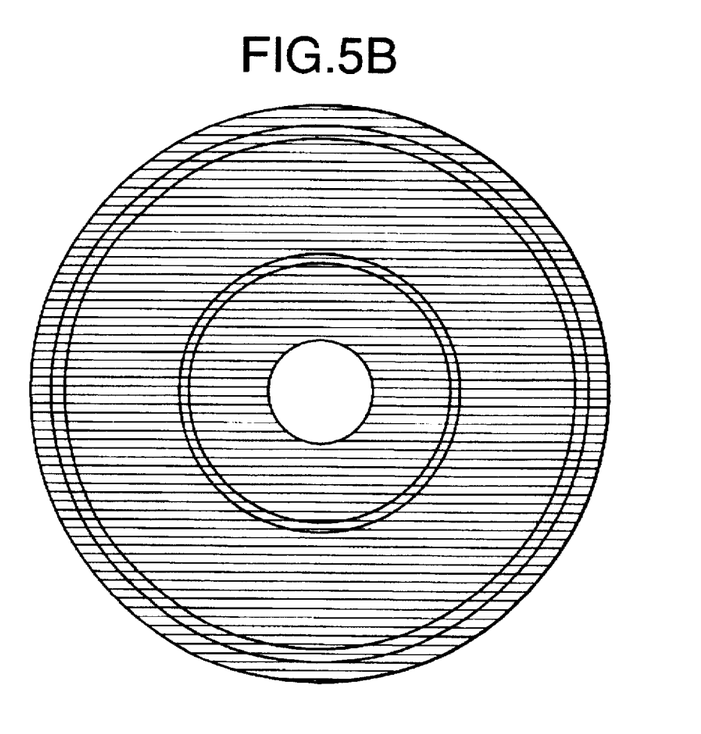

FIGS. 5A and 5B are diagrams showing the overall construction of the laminate type optical information recording medium of each embodiment, which is viewed from the A surface side and the B surface side respectively. According to each embodiment, the A-side and the B-side of the disc can be discriminated (identified) on the basis of the color difference.

As described above, according to the laminate type optical information recording medium of the present invention, it has two substrates or transparent resin layers having different transmission spectra in the visible region, or has two reflection layers having different reflection spectra in the visible region, so that the difference between the A-side and the B-side of the disc can be recognized as a color difference.

In the process of manufacturing the laminate type optical information recording medium, the optical information recording medium can be formed by only changing the material being used with no new manufacturing step and no new manufacturing facilities. Accordingly, the laminate type optical information recording medium in which the A-side and the B-side are discernible from each other on the basis of the color difference can be manufactured while preventing the rate of defects from increasing.

What is claimed is:

1. A plate-shaped optical information recording medium on which information is recorded and from which the information is optically reproduced by being irradiated with a reproduction laser beam and detecting the reproduction laser beam reflected from the medium, comprising:

a first transmission portion including a first substrate through which light incident to an obverse surface side of said optical information recording medium is transmitted;

a second transmission portion including a second substrate through which light incident to a reverse surface side of said optical information recording medium is transmitted; and a reflection portion which is provided between said first transmission portion and said second transmission portion and adapted to reflect the light transmitted through said first transmission portion and said second transmission portion, said first transmission portion and said second transmission portion having different transmission spectra in a visible region to enable a user to visually discriminate between said obverse and reverse sides.

2. The optical information recording medium as claimed in claim 1, wherein the reproduction laser beam is transmitted through said first substrate and an information recording face is formed on said first substrate so that information is optically reproduced, the reproduction laser beam is transmitted through said second substrate and an information recording face is formed on said second substrate so that information is optically reproduced, and said reflection portion has a first reflection layer which is formed on said information recording face of said first substrate and adapted to reflect the reproduction laser beam, a second reflection layer which is formed on said information recording face of said second substrate and adapted to reflect the reproduction laser beam, and an adhesive layer through which said first reflection layer and said second reflection layer are adhesively attached to each other, said first substrate and said second substrate having different transmission spectra in the visible region.

3. The optical information recording medium as claimed in claim 2 wherein a protection layer is interposed between said first reflection layer and said adhesive layer and between said second reflection layer and said adhesive layer.

4. The optical information recording medium as claimed in claim 1, wherein the reproduction laser beam is transmitted through said first substrate and an information recording face is formed on said first substrate so that information is optically reproduced, and said reflection portion has a first reflection layer which is formed on said information recording face of said first substrate and adapted to reflect the reproduction laser beam, and an adhesive layer through which said first reflection layer and said second substrate are adhesively attached to each other, said first substrate and said second substrate having different transmission spectra in the visible region.

5. The optical information recording medium as claimed in claim 4, wherein a protection layer is interposed between said first reflection layer and said adhesive layer and between said second substrate and said adhesive layer.

6. The optical information recording medium as claimed in claim 1, wherein said first transmission portion comprises:

the reproduction laser beam which is transmitted through said first substrate and an information recording face which is formed on said first substrate so that information is optically reproduced;

a first semi-transparent layer which is formed on said information recording face of said first substrate and adapted to reflect a part of the reproduction laser beam and transmit a residual part of the reproduction laser beam; and a first transparent resin layer which is formed so as to cover said first semi-transparent layer, through which the reproduction laser beam is transmitted and on which an information recording face is formed so that information is optically reproduced, said second transmission portion comprises:
- the reproduction laser beam which is transmitted through said second substrate and an information recording face which is formed on said second substrate so that information is optically reproduced;
- a second semi-transparent layer which is formed on said information recording face of said second substrate and adapted to reflect a part of the reproduction laser beam and transmit a residual part of the reproduction laser beam; and
- a second transparent resin layer which is formed so as to cover said second semi-transparent layer, through which the reproduction laser beam is transmitted and on which an information recording face is formed so that information is optically reproduced, and said reflection portion comprises:
- a first reflection layer which is formed on said information recording face of said first transparent resin layer and is adapted to reflect the reproduction laser beam;
- a second reflection layer which is formed on said information recording face of said second transparent resin layer and is adapted to reflect the reproduction laser beam; and
- an adhesive layer through which said first reflection layer and said second reflection layer are adhesively attached to each other, said first substrate and said second substrate having different transmission spectra in the visible region.

7. The optical information recording medium as claimed in claim 6, wherein a protection layer is interposed between said first reflection layer and said adhesive layer and between said second reflection layer and said adhesive layer.

8. The optical information recording medium as claimed in claim 1, wherein said first transmission portion comprises:
- the reproduction laser beam which is transmitted through said first substrate and an information recording face which is formed on said first substrate so that information is optically reproduced;
- a first semi-transparent layer which is formed on said information recording face of said first substrate and adapted to reflect a part of the reproduction laser beam and transmit a residual part of the reproduction laser beam; and
- a first transparent resin layer which is formed so as to cover said first semi-transparent layer, through which the reproduction laser beam is transmitted and on which an information recording face is formed so that information is optically reproduced, said second transmission portion comprises:
- the reproduction laser beam which is transmitted through said second substrate and an information recording face which is formed on said second substrate so that information is optically reproduced;
- a second semi-transparent layer which is formed on said information recording face of said second substrate and adapted to reflect a part of the reproduction laser beam and transmit a residual part of the reproduction laser beam; and
- a second transparent resin layer which is formed so as to cover said second semi-transparent layer, through which the reproduction laser beam is transmitted and on which an information recording face is formed so that information is optically reproduced, and said reflection portion comprises:
- a first reflection layer which is formed on said information recording face of said first transparent resin layer and adapted to reflect the reproduction laser beam;
- a second reflection layer which is formed on said information recording face of said second transparent resin layer and adapted to reflect the reproduction laser beam; and
- an adhesive layer through which said first reflection layer and said second reflection layer are adhesively attached to each other, said first transparent resin layer and said second transparent resin layer having different transmission spectra in the visible region.

9. The optical information recording medium as claimed in claim 8, wherein a protection layer is interposed between said first reflection layer and said adhesive layer and between said second reflection layer and said adhesive layer.

10. The optical information recording medium as claimed in claim 1, wherein said first transmission portion comprises:
- the reproduction laser beam which is transmitted through said first substrate and an information recording face which is formed on said first substrate so that information is optically reproduced;
- a first semi-transparent layer which is formed on said information recording face of said first substrate and adapted to reflect a part of the reproduction laser beam and transmit a residual part of the reproduction laser beam; and
- a first transparent resin layer which is formed so as to cover said first semi-transparent layer, through which the reproduction laser beam is transmitted and on which an information recording face is formed so that information is optically reproduced, said second transmission portion comprises:
- the reproduction laser beam which is transmitted through said second substrate and an information recording face which is formed on said second substrate so that information is optically reproduced;
- a second semi-transparent layer which is formed on said information recording face of said second substrate and adapted to reflect a part of the reproduction laser beam and transmit a residual part of the reproduction laser beam; and
- a second transparent resin layer which is formed so as to cover said second semi-transparent layer, through which the reproduction laser beam is transmitted and on which an information recording face is formed so that information is optically reproduced, and said reflection portion comprises:
- a first reflection layer which is formed on said information recording face of said first transparent resin layer and adapted to reflect the reproduction laser beam;
- a second reflection layer which is formed on said information recording face of said second transparent resin layer and adapted to reflect the reproduction laser beam; and
- an adhesive layer through which said first reflection layer and said second reflection layer are adhesively attached to each other, said first transparent resin layer and said second substrate having different transmission spectra in the visible region.

11. The optical information recording medium as claimed in claim 10, wherein a protection layer is interposed between said first reflection layer and said adhesive layer and between said second reflection layer and said adhesive layer.

12. The optical information recording medium as claimed in claim 1, wherein said first transmission portion comprises the reproduction laser beam which is transmitted through said first substrate and an information recording face which is formed on said first substrate so that information is optically reproduced, a first semi-transparent layer which is formed on said information recording face of said first substrate and adapted to reflect a part of the reproduction laser beam and transmit a residual part of the reproduction laser beam, and a first transparent resin layer which is formed so as to cover said first semi-transparent layer, through which the reproduction laser beam is transmitted and on which an information recording face is formed so that information is optically reproduced, and said reflection portion comprises a first reflection layer which is formed on said information recording medium of said first transparent resin layer and adapted to reflect the reproduction laser beam, and an adhesive layer through which said first reflection layer and said second substrate are adhesively attached to each other, said first substrate and said second substrate having different transmission spectra in the visible region.

13. The optical information recording medium as claimed in claim 12, wherein a protection layer is interposed between said first reflection layer and said adhesive layer and between said second substrate and said adhesive layer.

14. The optical information recording medium as claimed in claim 1, wherein said first transmission portion comprises the reproduction laser beam which is transmitted through said first substrate and an information recording face which is formed on said first substrate so that information is optically reproduced, a first semi-transparent layer which is formed on said information recording face of said first substrate and adapted to reflect a part of the reproduction laser beam and transmit a residual part of the reproduction laser beam, and a first transparent resin layer which is formed so as to cover said first semi-transparent layer, through which the reproduction laser beam is transmitted and on which an information recording face is formed so that information is optically reproduced, and said reflection portion comprises first reflection layer which is formed on said information recording medium of said first transparent resin layer and adapted to reflect the reproduction laser beam, and an adhesive layer through which said first reflection layer and said second substrate are adhesively attached to each other, said first transparent resin layer and said second substrate having different transmission spectra in the visible region.

15. The optical information recording medium as claimed in claim 14, wherein a protection layer is interposed between said first reflection layer and said adhesive layer and between said second substrate and said adhesive layer.

16. A plate-shaped optical information recording medium on which information is recorded and from which the information is optically reproduced by being irradiated with a reproduction laser beam to the medium and detecting the reproduction laser beam reflected from the medium, comprising:

a first transmission portion through which light incident to an obverse surface side of said optical information recording medium is transmitted;

a second transmission portion through which light incident to a reverse surface side of said optical information recording medium is transmitted; and a reflection portion which is provided between said first transmission portion and said second transmission portion and adapted to reflect the light transmitted through said first transmission portion and said second transmission portion, said reflection portion having different reflection spectra between light in the visible region which is transmitted through said first transmission portion and light in the visible region which is transmitted through said second transmission portion to enable a user to visually discriminate between said obverse and reverse sides.

17. The optical information recording medium as claimed in claim 16, wherein said first transmission portion has a first substrate through which the reproduction laser beam is transmitted and on which an information recording face is formed so that information is optically reproduced, said second transmission portion has a second substrate through which the reproduction laser beam is transmitted and on which an information recording face is formed so that information is optically reproduced, and said reflection portion has a first reflection layer which is formed on said information recording face of said first substrate and adapted to reflect the reproduction laser beam, a second reflection layer which is formed on said information recording face of said second substrate and adapted to reflect the reproduction laser beam, and an adhesive layer through which said first reflection layer and said second reflection layer are adhesively attached to each other, said first reflection layer and said second reflection layer having different transmission spectra in the visible region.

18. The optical information recording medium as claimed in claim 17, wherein a protection layer is interposed between said first reflection layer and said adhesive layer and between said second reflection layer and said adhesive layer.

19. The optical information recording medium as claimed in claim 16, wherein said first transmission portion has a first substrate through which the reproduction laser beam is transmitted and on which an information recording face is formed so that information is optically reproduced, said second transmission portion has a second substrate through which light is transmitted, and said reflection portion has a first reflection layer which is formed on said information recording face of said first substrate and adapted to reflect the reproduction laser beam, a second reflection layer formed on said second substrate, and an adhesive layer through which said first reflection layer and said second substrate are adhesively attached to each other, said first reflection layer and said second reflection layer having different transmission spectra in the visible region.

20. The optical information recording medium as claimed in claim 19, wherein a protection layer is interposed between said first reflection layer and said adhesive layer and between said second reflection layer and said adhesive layer.

21. The optical information recording medium as claimed in claim 16, wherein said first transmission portion comprises:
- a first substrate through which the reproduction laser beam is transmitted and on which an information recording face is formed so that information is optically reproduced;
- a first semi-transparent layer which is formed on said information recording face of said first substrate and adapted to reflect a part of the reproduction laser beam and transmit a residual part of the reproduction laser beam; and
- a first transparent resin layer which is formed so as to cover said first semi-transparent layer, through which the reproduction laser beam is transmitted and on which an information recording face is formed so that information is optically reproduced, said second transmission portion comprises:
- a second substrate through which the reproduction laser beam is transmitted and on which an information recording face is formed so that information is optically reproduced;
- a second semi-transparent layer which is formed on said information recording face of said second substrate and adapted to reflect a part of the reproduction laser beam and transmit a residual part of the reproduction laser beam; and
- a second transparent resin layer which is formed so as to cover said second semi-transparent layer, through which the reproduction laser beam is transmitted and on which an information recording face is formed so that information is optically reproduced, and said reflection portion comprises:
- a first reflection layer which is formed on said information recording face of said first transparent resin layer and adapted to reflect the reproduction laser beam;
- a second reflection layer which is formed on said information recording face of said second transparent resin layer and adapted to reflect the reproduction laser beam; and
- an adhesive layer through which said first reflection layer and said second reflection layer are adhesively attached to each other, said first reflection layer and said second reflection layer having different transmission spectra in the visible region.

22. The optical information recording medium as claimed in claim 21, wherein a protection layer is interposed between said first reflection layer and said adhesive layer and between said second reflection layer and said adhesive layer.

23. The optical information recording medium as claimed in claim 16, wherein said first transmission portion comprises
- a first substrate through which the reproduction laser beam is transmitted and on which an information recording face is formed so that information is optically reproduced,
- a first semi-transparent layer which is formed on said information recording face of said first substrate and adapted to reflect a part of the reproduction laser beam and transmit a residual part of the reproduction laser beam, and
- a first transparent resin layer which is formed so as to cover said first semi-transparent layer, through which the reproduction laser beam is transmitted and on which an information recording face is formed so that information is optically reproduced, said second transmission portion has a second substrate through which light is transmitted, and said reflection portion comprises
- a first reflection layer which is formed on said information recording face of said first transparent resin layer and adapted to reflect the reproduction laser beam,
- a second reflection layer formed on said second substrate, and
- an adhesive layer through which said first reflection layer and said second reflection layer are adhesively attached to each other, said first reflection layer and said second reflection layer having different reflection spectra in the visible region.

24. The optical information recording medium as claimed in claim 23, wherein a protection layer is interposed between said first reflection layer and said adhesive layer and between said second reflection layer and said adhesive layer.

* * * * *